March 29, 1932.  J. SAUR  1,851,776

SAFETY DEVICE

Filed April 19, 1928

Inventor
John Saur

Patented Mar. 29, 1932

1,851,776

UNITED STATES PATENT OFFICE

JOHN SAUR, OF GRAND RAPIDS, MICHIGAN

SAFETY DEVICE

Application filed April 19, 1928. Serial No. 271,350.

The invention is a two-handle control, constituting a safety device, for dangerous machines operated by a tripping mechanism. The object of the device is to trip the machine and keep both hands occupied away from the dangerous part of the machine while the said dangerous part is doing its work.

Figure 1:
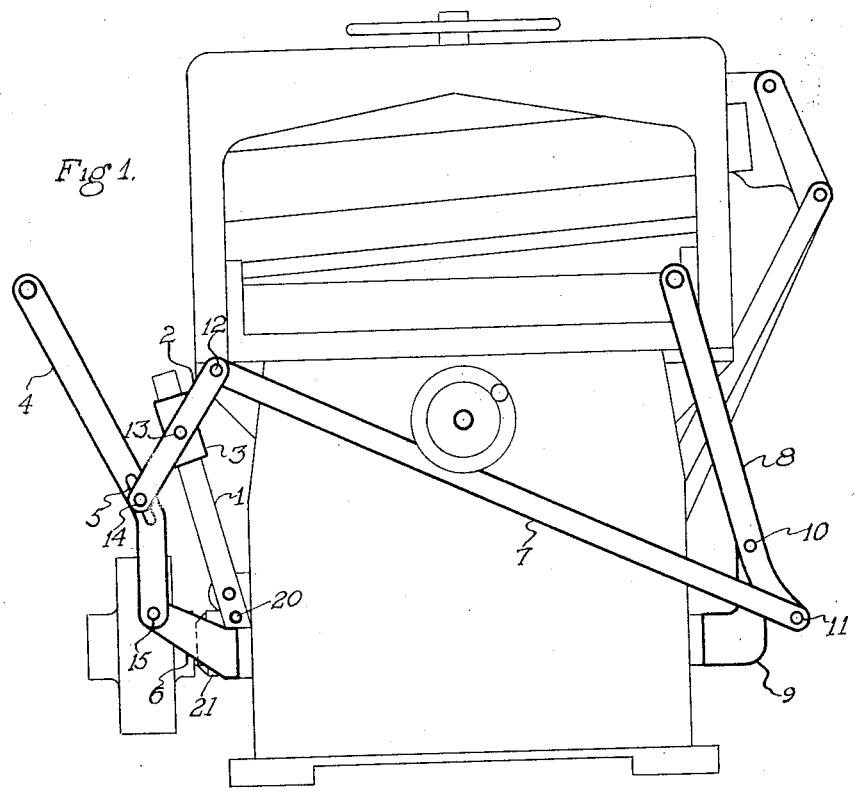
Figure 2:
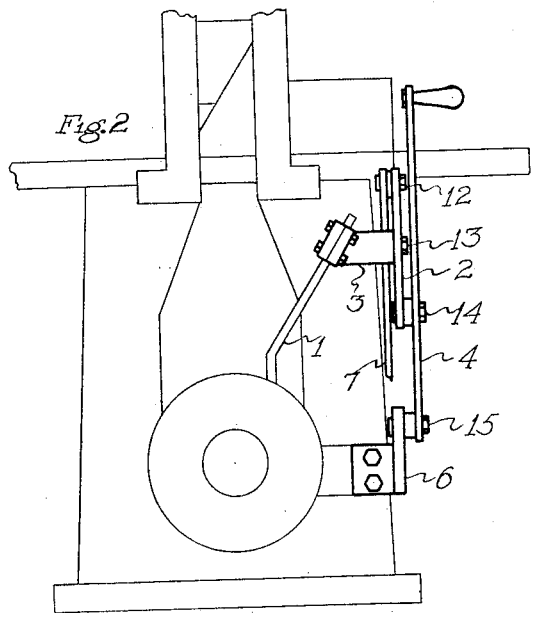

One form of the invention is illustrated in the accompanying drawings in which Fig. 1 shows the invention attached to a paper shear and Fig. 2 gives a left elevation of the same shear equipped with the same device, the top part of the shear being omitted.

The machine and its clutch lever 1, which in this case is the tripping mechanism, are drawn in light lines to distinguish them from the parts representing the invention which are drawn in heavy lines. The clutch lever 1 is pivoted to the sliding cone clutch member 21 by the pin 20.

The clutch lever 1 is fastened to the link 2 by the bracket 3. One end of the link 2 is connected to the lever 4 at the slot 5 and the lever 4 is attached to the bracket 6. The other end of the link 2 is fastened to the link 7 which in turn is fastened to the lever 8, the lever 8 being connected to the bracket 9. Brackets 6 and 9 in this case are bolted to the body of the power shear.

The illustration shows the levers thrown to the left. Should the operator grasp the lever 8 alone and push it to the right, the said lever would pivot on its joint 10, moving joints 11 and 12 to the left. This would cause link 3 to pivot at 13 throwing joint 14 to the right, and forcing lever 4 in the same direction, any tendency to bind being taken up by the slot 5. Thus, if the lever 8 alone were forced to the right, the tripping lever 1 of the shear would not be moved.

It will be evident that if the lever 4 alone were moved to the right, the same thing would take place in the reverse order, the lever 8 being thrown to the right without moving the tripping lever 1.

Likewise, if either one of the levers 4 or 8 alone were moved to the left no motion would take place in the tripping lever 1, the link 3 merely pivoting on the joint 13.

But when the operator grasps both levers at the same time and forces them toward each other, one of the levers (let us say in this case lever 8) acts as if it were stationary. When lever 8 is stationary the joints 10, 11, and 12 are stationary. If then lever 4 is moved towards 8, the joint 14 will move to the right and since joint 12 will not move, joint 13 must, thus moving the lever 1 to the right and tripping the machine.

If the lever 4 is considered stationary, joints 14 and 15 will not move. Hence, when the lever 8 is forced towards 4, the joint 12 moves to the right, taking 13 with it and tripping the machine.

It will be seen that the invention need not necessarily be fastened to the machine it controls as shown by the brackets 6 and 9, but may be fastened to the floor, wall, ceiling or any other convenient support so long as the link 3 can engage the tripping lever. It will also be seen that the link 7 in order to bring about the desired result and avoid obstructions may be composed of two or more links.

I claim:

1. A safety device for a machine having a clutch consisting in combination of a clutch lever, two hand-levers, one of said hand-levers having a slot, and a plurality of links permanently connecting said levers, one of said links being permanently pivotally connected to said clutch lever and having a sliding, pivotal engagement with said slotted hand-lever.

2. A safety device for a machine having a clutch comprising in combination of two pivoted hand levers each of which is adapted to simultaneously be grasped by a hand of the operator, a lever pivoted to one of the clutch members and to the machine for throwing the clutch in and out of engagement, a plurality of links pivoted to each other and to the two hand levers and the clutch lever whereby relative movement of the levers toward each other engages the clutch and relative movement of the levers away from each other disengages the clutch.

3. A safety device for a machine having a clutch comprising in combination of two hand levers each adapted to be grasped by a hand of the operator, a plurality of links having a permanent pivoted connection with the hand levers and to each other, the pivotal connection of one of said links with one of said hand levers being movable, and a clutch lever having a permanent pivotal connection with one of the clutch members and with one of the links whereby relative movement of the hand levers toward each other engages the said clutch.

4. A safety device for a machine having a clutch comprising in combination of two hand levers one of said hand levers having a slot, a pivotally mounted clutch lever pivotally engaging one of the clutch members, and a plurality of links having permanent pivotal connections with each other, with the hand levers and with the clutch lever, one of said links pivotally engaging the slotted lever in the said slot.

JOHN SAUR.